(12) United States Patent
Brenner et al.

(10) Patent No.: US 7,817,594 B2
(45) Date of Patent: Oct. 19, 2010

(54) METHOD FOR OPERATING A DEVICE IN A RADIO ACCESS NETWORK OF A RADIO COMMUNICATION SYSTEM AS WELL AS RADIO ACCESS NETWORK AND DEVICE

(75) Inventors: Jorg Brenner, Hamburg (DE); Ricklef Dembski-Minssen, Sittensen (DE); Dirk Schwenke, Hamburg (DE); Florian Wolff, Hamburg (DE); Stefan von der Heide, Norderstedt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 861 days.

(21) Appl. No.: 11/600,812

(22) Filed: Nov. 17, 2006

(65) Prior Publication Data
US 2007/0127411 A1 Jun. 7, 2007

(30) Foreign Application Priority Data
Nov. 18, 2005 (EP) .................................. 05025230

(51) Int. Cl.
*H04W 4/00* (2009.01)
*H04J 3/00* (2006.01)
(52) U.S. Cl. ........................................ 370/328; 370/345
(58) Field of Classification Search ................. 370/328, 370/345, 376, 401, 395.3, 467, 352, 353, 370/389, 395.1, 465–468, 496, 493
See application file for complete search history.

(56) References Cited

U.S. PATENT DOCUMENTS

| | | | |
|---|---|---|---|
| 5,566,225 A | 10/1996 | Haas | |
| 6,701,449 B1 | 3/2004 | Davis et al. | |
| 6,982,993 B1 * | 1/2006 | Claveloux et al. | 370/503 |
| 7,164,694 B1 * | 1/2007 | Nodoushani et al. | 370/467 |
| 2002/0193132 A1 * | 12/2002 | Wu | 455/513 |
| 2003/0002525 A1 * | 1/2003 | Grilli et al. | 370/465 |

FOREIGN PATENT DOCUMENTS

| | | |
|---|---|---|
| DE | 102 19 154 A1 | 11/2003 |
| EP | 1 220 513 A2 | 7/2002 |

\* cited by examiner

*Primary Examiner*—Melody Mehrpour
(74) *Attorney, Agent, or Firm*—Staas & Halsey LLP

(57) ABSTRACT

In a method for operation of a device in a radio access network of a radio communication system, the device is arranged between a first network element and a second network element of a radio access network, receives at a first point in time from the first network element a first heartbeat and sends to the first network element at a second point in time a first acknowledgement signal as a response to the first heartbeat, with the first acknowledgement signal signaling to the first network element that a connection exists between the first network element and the second network element. At a third point in time the device sends a second heartbeat to the second network element, with the second network element, on receiving the second heartbeat sending as a response a second acknowledgement signal to the device in order to signal to the device the existence of a connection between the device and the second network element. The first acknowledgement signal is at least partly sent even if no second acknowledgement signal has been received between the first point in time and the second point in time.

20 Claims, 3 Drawing Sheets

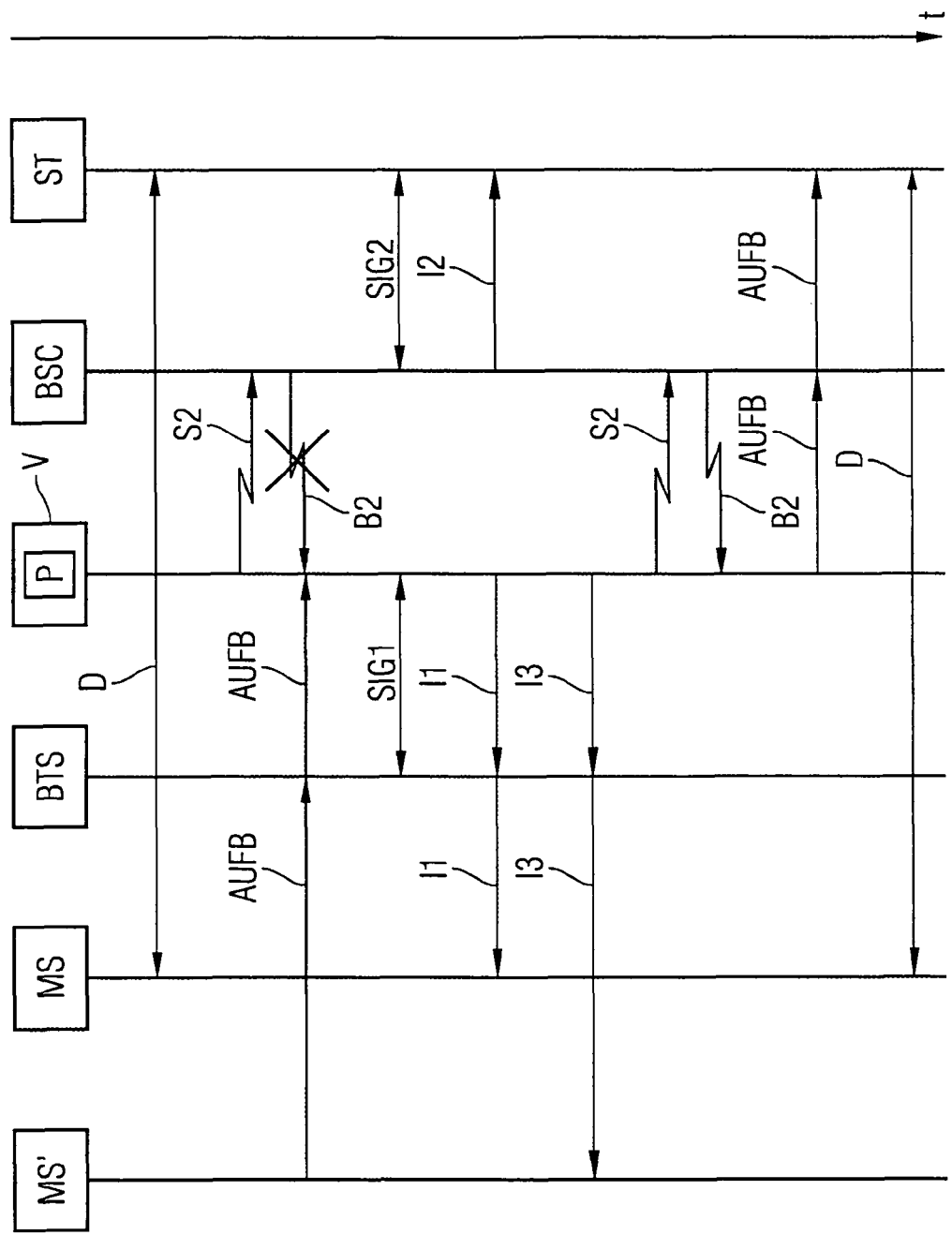

METHOD FOR OPERATING A DEVICE IN A RADIO ACCESS NETWORK OF A RADIO COMMUNICATION SYSTEM AS WELL AS RADIO ACCESS NETWORK AND DEVICE

CROSS REFERENCE TO RELATED APPLICATIONS

This application is based on and hereby claims priority to European Application No. 05025230.3 filed on Nov. 18, 2005, the contents of which are hereby incorporated by reference.

BACKGROUND

The invention relates to a method for operating a device in a radio access network of a radio communication system as well as to a corresponding radio access network and a corresponding device.

In radio access networks in accordance with the GSM (Global System for Mobile Communications) for example, control signals, known as heartbeats, are transmitted between interconnected network elements, enabling interruptions in the connections to be detected.

Connections are interrupted for example if signals transmitted on a connection between two network elements become so heavily attenuated that the network element provided for receiving can no longer detect the signals to be received. A connection is made between network elements for example over a fixed line or an air interface. With connections over an air interface for example unpredictable connection interruptions typically occur since the signal transmission path is subject to random fluctuations which are caused by the nature of the air interface—typical examples being atmospheric problems or stray interference from adjacent signal frequency bands. Furthermore connections can be interrupted by the failure of a network element.

For example if a base station receives from a base station controller or a base station controller receives from a base station a corresponding control signal (heartbeat), an acknowledgement signal is sent as a response, on the basis of which the station receiving the control signal detects that the control signal was received and that the connection thus currently exists. If a network element of a radio access network, for example a base station or a base station controller, detects an interruption of the connection, i.e. no acknowledgement signal is received for a control signal transmitted, all existing data connections are aborted and must be set up again in order to continue with them.

These types of control signals for checking a connection are exchanged between network elements of radio access networks at a predetermined repetition rate. Connection interruptions which begin and also end respectively between two points in time provided for detection of acknowledgement signals cannot be detected. All connection interruptions are detected which last longer than the period of time between two detection points or which only occur after the receipt of a first heartbeat but which last until the receive time of a second heartbeat, which depends on the predetermined repetition rate. A detection with a higher predetermined repetition rate can have the disadvantage that connection interruptions which are so short as to be non-critical for a data transmission undertaken at this point in time are also detected and thus lead to a current data transmission being aborted. If a lower predetermined repetition rate is used for detection, a connection interruption with a duration which is disruptive for example in the case of a time-critical data transmission possibly may not be detected.

SUMMARY

One possible object underlying the invention is thus to specify an advantageous method as well as an advantageous radio access network and an advantageous device for detection of connection interruptions in a radio access network with predetermined repetition rates for heartbeats for detection of connection interruptions, by which the duration of detectable connection interruptions can be changed.

The inventors propose a method for operating a device in a radio access network of a radio communication system, the device being arranged between a first network element and a second network element of the radio access network. The device receives a first heartbeat at a first point in time from the first network element and sends a first acknowledgement signal as a response to the first heartbeat back to the first network element at a second point in time, in which case the first acknowledgement signal signals to the first network element that there is a connection between the first network element and the second network element. At a third point in time the device sends a second heartbeat to the second network element, in which case the second network element, on receipt of the second heartbeat, sends a second acknowledgement signal to the device in order to signal that a connection exists between the device and the second network element. In accordance with the method the device also sends the first acknowledgement signal at least partly if no second acknowledgement signal is received between the first point in time and the second point in time.

There is provision in the radio communication system for example for the first heartbeat to be transmitted between network elements for checking that a connection exists and for the first acknowledgement signal to be sent as a response if a connection exists. The method now enables the fact that a connection exists to be signaled to the first network element even if the device—and thus also the first network element—does not have a connection to the second network element or is not informed about whether it has a connection to the second network element since it has not received a second acknowledgement signal. The device can thus be operated in such a way that the first network element assumes that it has a connection to the second network element, although, at the time that it receives the first confirmation signal there may possibly not be any connection at all to the second network element. The device thus makes it possible to ignore a connection interruption between first and second network element.

Advantageously the first and the second heartbeat are received and transmitted repeatedly and different repetition rates are used in each case.

In this way the radio communication system can be operated in such a way that, by using a first repetition rate for the first heartbeat, connection interruptions with a first duration, which is equal to or greater than the reciprocal of the first repetition rate can always be detected, if an device is not used between network elements. Using the device with a second repetition rate for the second heartbeat means that connection interruptions cannot be detected which would have been detected without the second heartbeat. This can be achieved for example by the second repetition rate being lower than the first repetition rate. Connection interruptions with a duration which is equal to or less than the reciprocal of the first repetition rate in each case, but is lower than the reciprocal of the second repetition rate, are not detected in this case if they occur between two receive times predetermined by the second repetition rate of the second heartbeat. What the method can thus achieve is not detecting, and thus not taking into account connection interruptions between the first and the second network element with a duration which, with exclusive used of the first repetition rate without using the device, would have been detected in each case and thus for example would have led to a connection interruption for a subscriber station connected to the first network element for example.

Advantageously the repetition rate for the second heartbeat depends on the type of connection between the device and the second network element.

Type of connection is to be taken to mean both the type of transmitted data, e.g. real-time data or non-real-time data, and also the physical type of the connection, e.g. satellite connection, electrical connection, connection by optical frequencies.

The repetition rate of the second heartbeat can advantageously be selected so that a high repetition rate is selected for time-critical connections, which enables very small connection interruptions to also be safely detected. For connections where time is not critical, e.g. data transmissions for software download, or when a system is idling, i.e. with no calls for which data has to be forwarded between the first and second network element. A low repetition rate can be selected for the second heartbeat, so that the connection between the device and the second network element can even be deliberately interrupted between two times at which the second heartbeat is sent. The latter is for example of advantage with cost-intensive satellite connections to enable costs savings to be obtained. It is thus of advantage for the repetition rate of the second heartbeat to be set so that its reciprocal is smaller than the shortest duration of a connection interruption which is to be safely detected.

There is also provision for data of a radio connection of a subscriber station of the radio communication system to be transmitted between the first network element and the second network element. Furthermore the device establishes that its connection to the second network element has been interrupted and, for the duration of the interruption, exchanges and/or processes data relating to the first network element which is needed to maintain the radio connection.

What this achieves is that, even if a connection interruption is determined, because the device for example does not receive any second acknowledgement signal as response to the heartbeat sent by it, a connection interruption to subscriber stations of the radio communication system is still avoided.

A further embodiment makes provision for the device to receive data via the first network element for creating a data transmission to a subscriber station accessible via the second network element of the radio communication system. After the device determines an interruption of its connection to the second network element, it stores data received for creating the data transmission and sets up the data transmission on the basis of the stored data as soon as a connection exists to the second network element.

This avoids the setting up of a data transmission, i.e. the setup of a connection, having to be signaled again after it has been established during an attempt to set up the data transmission that there is an interruption of a connection between the first and the second network element.

Advantageously the device sends information regarding the interruption of the connection to the subscriber stations and/or a station wishing to set up a data transmission.

The relevant information is for example a recorded announcement from the voice memory system which announces that, once the interruption of the connection has ended, the radio connection and thereby the transmission of the data will be continued or that the data transmission required by the station will be automatically set up for example. What this achieves is that a subscriber making use of the subscriber station or the station aborts the radio connection himself or foregoes the data transmission because the connection was interrupted.

In accordance with an embodiment the first network element is hierarchically arranged above the second network element.

A further development provides for the first network element to be a base station controller and the second network element a base station.

An alternative further development provides for the first network element to be a base station and the second network element a base station controller.

A further embodiment provides for a further device to be arranged between the device and the second network element and instead of the second network element on receipt of the second heartbeat to send the second acknowledgement signal to the device as a response.

Use of two devices, between which, instead of the first heartbeat and the first acknowledgement signal, the second heartbeat and the second acknowledgement signal are exchanged, makes it possible to employ the method in a radio access network in such a way that both first network elements and also second network elements which are already operated in a radio access network without the method do not have to be changed in order to enable the method to be used in the radio access network. Advantageously the further device is embodied to send a third acknowledgement signal to the second network element in response to the third heartbeat received from the second network element. The third acknowledgement signal signals to the second network element that a connection exists to the first network element. The further device is in addition embodied to also send the third acknowledgement signal at least from time to time if no connection to the device and thus the first network element exists, or if the further device does not have any information about the status of the connection and—e.g. through a second acknowledgement signal received from the device as a response to a second heartbeat sent to the device.

This means that both the first network element and also the second network element receive from the device or from the further device information that there is a connection between the first and the second network element even if the device and/or the further device has not received a second acknowledgement signal in each case which signals to it that a connection exists between the device and the further device. Even for an interruption to the connection between the device and further device, the method makes it possible to still signal to the first and second network element that a connection exists between first and second network element.

Advantageously the further device or the second network element of a station with which the subscriber stations exchange data sends information relating to the interruption of the connection.

It is especially of advantage for heartbeats to be transmitted between the device and the second network element or between the device and the further device over an air interface.

In radio access networks in particular in which radio connections are used between network elements for data transmission, it can be of advantage if connection interruptions which are detected in the use of the first heartbeat and the first acknowledgement signal are not detected by the use of the device and/or the further device.

For example a radio connection between a base station which is located in an aircraft and an associated base station which is located on the ground is implemented by a satellite system. This can lead to short connection interruptions, which however. For executing a data transmission at the time of the connection interruption, are not critical for the execution of the data transmission because of the short duration of the connection interruption. In a known radio access network which exclusively uses the first heartbeat and the first acknowledgement signal to detect connection interruptions, the result without the method can thus be unnecessary connection interruptions if a connection interruption is detected by the first heartbeat and the first acknowledgement signal. This is advantageously avoided by using the device and/or the further device.

Furthermore satellite connections are expensive for example and can advantageously be deliberately interrupted from time to time, if for example no payload data (e.g. call data) is available for transmission, since the first and the second network element continue to receive first and third acknowledgement signals in each case. Costs are saved during the connection interruption in this way. For example a voice connection set up via the first and second network element between for example two subscriber stations will not be aborted automatically by the method as a result of the deliberate interruption of a connection.

In addition, the method can also be embodied in such a way that the second heartbeat or the second acknowledgement signal is sent at a higher repetition rate than the first heartbeat and the first acknowledgement signal. For highly real-time-critical applications, for example real-time applications, this allows connection interruptions to be also detected which are shorter than connection interruptions which are able to be detected by the first heartbeat and the first acknowledgement signal using a single rigidly-defined repetition rate.

A great variability for the detection of connection interruptions is achieved with the method. Another achievement is that subscribers who for example operate a subscriber station and are subjected to connection interruptions can be kept from ending a call or a data transmission on their part by the previously mentioned information about the connection interruption. Instead they are obliged by the information to wait until the connection interruption has ended. For example it can also be signaled to the subscribers that no charges are being calculated while they are waiting for the end of the connection interruption. For this purpose the device and/or the further device advantageously sends a corresponding signal to the billing center of the radio communication system.

The radio access network as well as the inventive device each have all features needed for executing the method.

BRIEF DESCRIPTION OF THE DRAWINGS

These and other objects and advantages will become more apparent and more readily appreciated from the following description of the preferred embodiments, taken in conjunction with the accompanying drawings of which.

DETAILED DESCRIPTION OF THE PREFERRED EMBODIMENT

Figure 1:
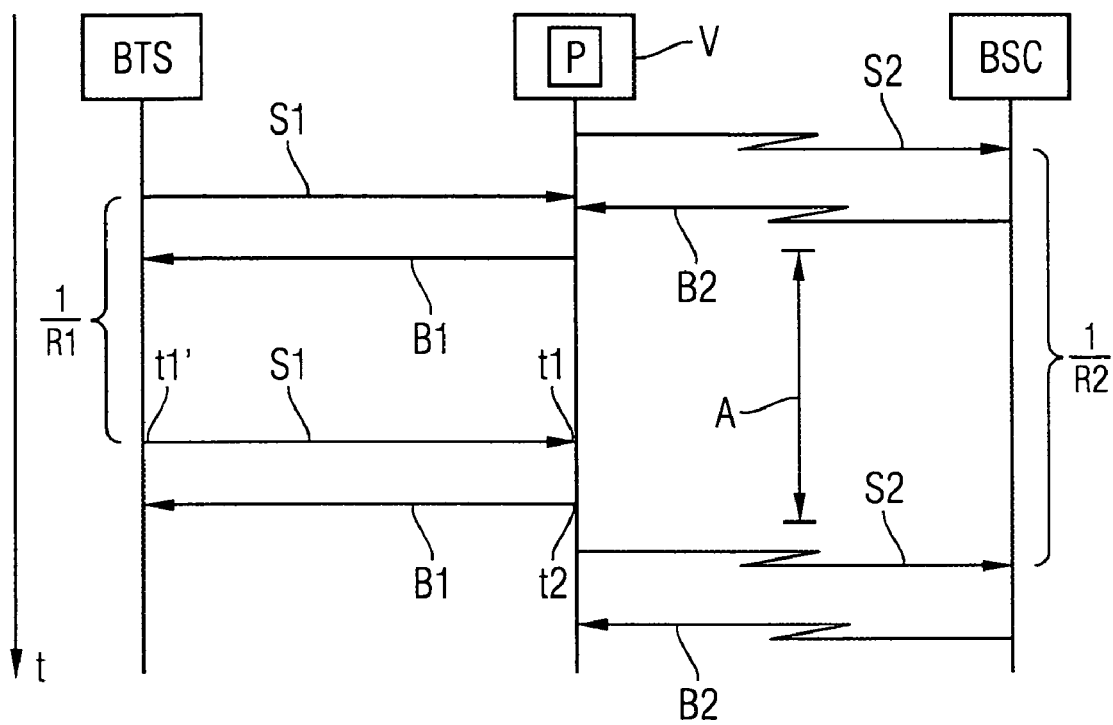
FIG. 1 a first schematic diagram of a method for operating a device according to one potential embodiment of the present invention, FIG. 2 a second schematic diagram of a method for operating a device and a further device according to one potential embodiment of the present invention, and FIG. 3 a third schematic diagram of a method according to one potential embodiment of the present invention.

Reference will now be made in detail to the preferred embodiments, examples of which are illustrated in the accompanying drawings, wherein like reference numerals refer to like elements throughout.

A subscriber station is for example a mobile radio terminal, especially a mobile telephone or a mobile or static device for transmission of picture and/or sound data for fax, Short Message Service SMS, Multimedia Messaging Service MMS and/or e-mail dispatch and/or for Internet access.

A network element of a radio access network of a radio communication system is for example a base station or a base station controller.

A base station is for example a base station which receives payload and/or signaling data from user equipment and sends payload and/or signaling data to user equipment. A base station is connected via network-side devices to a core network via which connections are made to other radio communication systems or into other data networks. A data network is for example taken to mean the Internet or a fixed network with for example circuit switched or packet switched connections for voice and/or data. A network-side device is for example a base station controller which is used for controlling radio transmissions between the base station and user equipment. A connection between the base station and a base station controller can be made both via an air interface, for example a satellite connection or hard wired via for example an electrical or optical connection.

The method can be used advantageously in any radio communication system. Radio communication systems are taken to mean systems in which a data transmission between base stations takes place over an air interface. Data transmission can be both bidirectional and also unidirectional. Radio communication systems are especially any mobile radio system for example in accordance with the GSM (Global System for Mobile Communications) or the UMTS (Universal Mobile Telecommunications System) standard. Future mobile radio communication systems, for example of the fourth generation, as well as ad-hoc-networks, are also to be understood as radio communication systems. Radio communication systems are for example also WLANs (Wireless Local Area Networks) in accordance with the IEEE (Institute of Electrical and Electronics Engineers) 802.11a-i, HiperLAN1 and HiperLAN2 standards (HiperLAN: High performance radio local area network) as well as Bluetooth networks and broadband networks with wireless access, for example in accordance with IEEE 802.16.

The method is described below using a radio communication system in accordance with the GSM standard as an example, without however wishing to express that the method is to be restricted to this.

FIG. 1 shows schematically a base station BTS as first network element, a device V with an processor P for controlling the device V and as a second network element a base station controller BSC, by which the radio connections between subscriber stations and the base station BTS can be controlled. The base station BTS, the device V and the base station controller BSC are arranged in a radio access network of a radio communication system.

Regardless of whether the base station BTS is maintaining a radio connection with a subscriber station, a radio access network of the radio communication system is operated in such a way that, to check the connection, a first heartbeat is sent from the base station BTS to the base station controller BSC at a first repetition rate R1. If the base station BTS receives a first acknowledgement signal B1 as a response to a first heartbeat S1, this signals to it that the connection between the base station BTS and the base station controller BSC is not interrupted.

In accordance with the method, the device V is arranged between the base station BTS and the base station controller BSC. The device V captures the first heartbeat S1 intended for the base station controller BSC and signals to the base station BTS, by sending the first acknowledgement signal B1, that a connection to the base station controller BSC exists. In order to obtain information about the existence of a connection to the base station controller BSC for itself, the device V sends a second heartbeat S2 with a second repetition rate R2 to the base station controller BSC which, on receipt of the second heartbeat S2, sends as a response a second confirmation signal B2 to the device V and thereby signals to the device V that a connection to the base station controller BSC exists.

The time interval between the receipt of the first heartbeat and/or of the second heartbeat and the transmission of the first acknowledgement signal and/or of the second acknowledgement signal is for example fixed in advance are able to be varied for the device V and/or the base station controller BSC. Preferably the first acknowledgement signal and the second acknowledgement signal are each sent immediately after receipt of the first heartbeat or of the second heartbeat respectively.

The result of using different repetition rates R1, R2 for the first heartbeat S1 and the second heartbeat S2 is that the first heartbeat S1 is sent for example at a time t1' by the base station BTS and subsequently received by the device V at a first time t1 which lies between two transmissions of the second heartbeat S2 by the device V. At the first time t1 of the receipt of the first heartbeat S1 the second acknowledgement signal B2 received for the last transmission of the second heartbeat S2 is already out-of-date (the last receipt of the second acknowledgement signal is for example more than 1/(2*R2) ago) and a further second acknowledgement signal B2 is not yet available. The device can thus not make any reliable assumption as to whether a connection exists to the base station controller BSC. However the device V sends the first acknowledgement signal B1 to the base station BTS at the second time t2. This signals to the base station BTS that a connection exists between the base station BTS and the base station controller BSC. In actual fact the connection between the device V and the base station controller BSC was interrupted during a period identified by the letter A in FIG. 1. This period however lay between the two transmissions of the second heartbeat S2 shown, and was thus not detected.

Had the first heartbeat been used exclusively without the device V, the first heartbeat would have been sent during the first connection interruption from the base station BTS to the base station controller BSC and the base station BTS would not have received the first acknowledgement signal B1 at the second time. This would have resulted in a connection interruption for existing data transmissions. However the method enables the base station BTS to receive the first acknowledgement signal B1 and an existing data transmission not shown can be continued despite the connection interruption, since at a third point in time T3, at which the second heartbeat S2 will be sent from the device V to the base station controller BSC, the interruption no longer exists.

The second repetition rate R2 is selected in this exemplary embodiment for example such that connection interruptions with a duration not exceeding the time interval between two transmissions of the second heartbeat S2, i.e. 1/R2, and which may thus, depending on their relative position in relation to the second heartbeat S2 sent, possibly not be detected, are not disruptive for existing data transmissions.

In accordance with FIG. 1 the second heartbeats S2 and the second acknowledgement signals B2 are sent between the device V and the base station controller BSC over an air interface. For example the base station BTS is arranged in an aircraft, in which case the device V is also arranged in the aircraft and is either arranged in the base station BTS or is directly connected to it. The base station controller BSC is for example arranged on the ground and a radio connection between the device V and the base station controller BSC is made via a satellite connection. In this exemplary embodiment, because of the satellite connection the second repetition rate R2 is lower than the first repetition rate R1. In this way a likelihood of a connection being aborted because of a connection interruption between device V and base station controller BSC is lower than would, be the case if the second heartbeat S2 were also to have been sent at the first repetition rate.

In this exemplary embodiment the base station controller BSC, compared to further base station controllers BSC in the radio access network of the radio communication system which are not connected to a device corresponding to the device V, has been adapted in such a way as to process the second heartbeat S2 and be able to send as a response the second acknowledgement signal B2. The radio access network features for example further base station controllers BSC and further base stations which are for example both arranged on the ground and between which for example the first heartbeat S1 and the first acknowledgement signal B1 are sent directly, i.e. without a corresponding device, over a wired connection.

In addition to the direction of transmission of the first heartbeat S1 and also of the second heartbeat S2 shown in FIG. 1, there can also be provision for the device V to itself send the first heartbeat S1 to the base station BTS, in order for its part to receive the first acknowledgement signal B1 from the base station BTS. Furthermore there can be provision for the base station controller BSC for its part to send the second heartbeat S2 to the device V in order to receive as a response the second acknowledgement signal B2. In this way, in a manner similar to that described in FIG. 1, the reverse direction of transmission can be checked in each case in respect of connection interruptions. This is especially of advantage if the directions of transmission have different transmission characteristics, for example because of different frequencies and/or different transmission paths.

For reasons of clarity transmissions in the directions of transmission just mentioned are not shown in FIG. 1.

Figure 2:
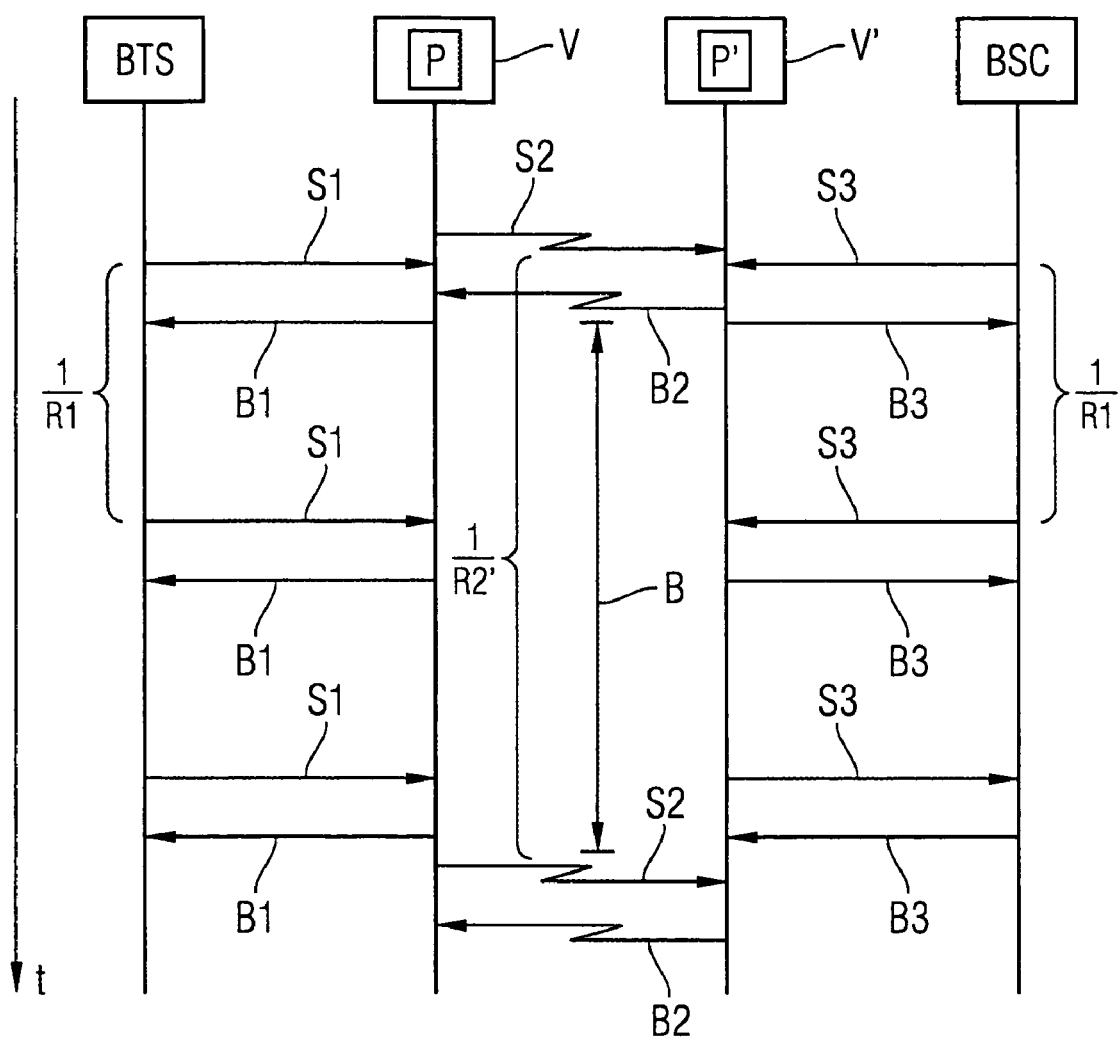

FIG. 2 Shows a schematic diagram of the timing of the transmission of first heartbeats S1 and second heartbeats S2 as well as first acknowledgement signals B1 and second acknowledgement signals B2 In accordance with the corresponding execution sequence shown in FIG. 1.

In this exemplary embodiment too, in a period identified by the letter B, the connection interruption occurs between a first transmission of the second heartbeat S2 from the device V and a second transmission of the second heartbeat S2 from the device V. In this case too the base station BTS still receives a signal from the device V that a connection to the base station controller BSC exists in that the device V responds twice during the period B to a heartbeat S1 received with an acknowledgment signal B1.

Unlike the exemplary embodiment shown in FIG. 1, in this exemplary embodiment a further device V' is arranged between the device V and the base station controller BSC, said device being controlled by a further processor P'. The further device V' receives the second heartbeat S2 from the device V instead of the base station controller BSC and on receipt of the signal sends as a response the second acknowledgement signal B2, to acknowledge an existing connection between the device V and the further device V'.

In order to check whether a connection exists between a base station BTS and the base station controller BSC, the base station controller BSC sends a third heartbeat to the base station BTS, for example at the same repetition rate with which the base station BTS sends the first heartbeat S1. The third heart beat S3 is captured by the further device and as their response the base station controller BSC receives a third acknowledgement signal B3, which signals to the base station controller BSC that a connection exists to the base station controller BSC. In this way for example the base station controller BSC also receives a signal during the period B that a connection exists to the base station BTS. In the same way the further device V' checks the connection to the base station controller BSC with the third heartbeat and receives as a response the third acknowledgement signal. The direction of transmission is not shown for reasons of clarity.

The third heartbeat is for example also transmitted at the first repetition rate R1 and for example is transmitted synchronously with first heart beat S1. Naturally the third heart beat S3 can also be sent with a different repetition rate and/or asynchronously.

Just as described in FIG. 1, as an alternative or in addition, the first and second heartbeats S1, S2 as well as the first and second acknowledgement signals B1, B2 can be transmitted in the opposite direction respectively. These directions of transmission are however not shown in FIG. 2 for reasons of clarity.

The use of the further device V' makes it possible for the method to also be used in radio communications systems in which base stations and base station controllers are used which are not themselves in a position to support the method. For example the third heart beat S3 corresponds to the first heart beat S1 and is provided in the radio access network to be sent between network-side devices, for example between the base station BTS and the base station controller BSC in order to be able, without a device V and a further device V', to detect connection interruptions using the first repetition rate R1 between the base station BTS and the base station controller BSC.

Preferably the embodiment in accordance with FIG. 2 is used in a radio access network in which the base station BTS is arranged in an aircraft whereas the base station controller BSC is located on the ground. The device V is likewise arranged in the aircraft. The further device V' is connected to the device V via a radio connection, for example a satellite connection, and like the base station controller BSC, is located on the ground.

In FIG. 2 the second heartbeat S2 is sent between the device V and the further device V' at a further repetition rate R2' which is higher than the second repetition rate R2 according to the exemplary embodiment from FIG. 1 In this way even greater periods for connection interruptions are tolerated than those shown in FIG. 1 as being the case for the second repetition rate R2. For example the interruption of the connection shown in FIG. 2 during period B involves a deliberate interruption of the connection between the device V and the further device V', in order for example to save money on the expensive satellite link between the device V and the further device V'. During the period B the satellite link is for example not needed because of the absence of data to be transmitted. Despite this both the base station BTS and also the base station controller BSC continue to be sent signals that a connection exists so that existing radio connections from subscriber stations which are connected to the base station BTS but for example have no data to transmit during the period B, are not interrupted, although the satellite link between the device V and the further device V' was interrupted for the period B.

This option does not exist in radio communication systems with radio access networks in which the first heartbeat is sent directly between the base station BTS and the base station controller BSC using exclusively the first repetition rate. In this case a deliberate or accidental interruption of the connection between the base station BTS and the base station controller BSC would namely have been detected and would have resulted in all data transmissions, i.e. all radio connections between subscriber stations and the base station BTS being aborted.

A further development is shown in a schematic diagram in FIG. 3. In the exemplary embodiment for FIG. 3 first heartbeats S1 continue to be sent from the base station BTS to the device V and second heartbeats S2 from device V to the base station controller BSC, as has already been described with reference to FIG. 1. For reasons of clarity however only second heartbeats S2 of the device V are shown. At the beginning of the time sequence in FIG. 3 a mobile station MS is maintaining a connection with a station ST, in which case the mobile station is connected to the base station BTS via a radio connection, and the station ST is connected via further devices not shown in the diagram to the base station controller BSC in order to exchange data D via the device V and the base station BTS with the mobile station MS.

The device V sends the second heartbeat S2 to the base station controller BSC and does not receive the second acknowledgement signal B2 within a receive period provided for the purpose. This is expressed in FIG. 3 by the fact that the connection arrow which represents the second acknowledgement signal B2 is shown with a cross through it. The device V thus recognizes that the connection to the base station controller BSC is interrupted. At the same time the device receives from a further mobile station MS' via the base station BTS signaling data AUFB, by which the further mobile station MS' wishes to set up a data transmission, i.e. a connection to the station ST. The device V stores this connection setup request, i.e. the signaling data AUFB, in order to use the signaling data AUFB for automatic setup of the data transmission once a connection to the base station controller BSC exists again.

Furthermore the device V exchanges first signaling data SIG1 with the base station BTS which contains all information which for example is needed in accordance with a radio standard used in order to maintain the radio connection between the mobile station MS and the base station BTS. Therefore a connection to the station ST appears to continue to exist both for the base station BTS and also the mobile station MS. Furthermore the base station controller BSC also detects, for example because it does not receive a second acknowledgement signal B2 sent in response to the second heartbeat sent by it to the device, or because at the predetermined point in time it has not received a second heartbeat from the device V indicating that the connection to the device V is interrupted. The base station controller BSC thus takes over the exchange of second signaling data SIG2 with the station ST, in order to signal to the station ST that a connection still exists with the mobile station MS.

Furthermore the device V sends to the mobile station MS first information I1, and the base station controller BSC sends to the station ST second information I2. It can be taken from the first and second information I1, I2 respectively that the connection is temporally interrupted but that data transmission can be continued as soon as a connection exists again. The device V sends a third information I3 to the further mobile stations MS', from which it can be taken that the connection is temporally interrupted but the desired data transmission will be set up automatically as soon as a connection exists again. The first information I1, the second information I2 and the third information I3 are each for example a recorded announcement from a voice memory system which announces to a subscriber operating the mobile station MS, the further mobile stations MS' or the stations ST in the form of a voice message that the connection is interrupted and asks them not to manually abort the connection since the data transmission will be continued after the connection is re-established or will be set up automatically. The first second and third information I1, I2 thus serve as information for a relevant subscriber of the stations involved he can manually end the connection or bought the set-up of a data transmission and does not intervene in the operation of the stations. On the other hand the first and second signaling data SIG1, SIG2 of the mobile station MS and of the station ST, are signaled unnoticed by the relevant subscribers and control the operation of the stations MS, ST in such a way that the relevant connection is not automatically aborted as a result of the interrupted connection.

Subsequently the device V again sends the second heartbeat S2 to the base station controller BSC and, since the connection interruption no longer exists, receives the second acknowledgement signal B2 to acknowledge the existing connection. Then the device V initiates on the basis of the stored signaling data AUFB via the base station controller BSC representing the further mobile station MS' a connection setup with the station ST and thus sets up the data transmission. This avoids the further mobile station MS' having to send the signaling data AUFB needed for setting up a data connection again because of the detected connection interruption.

Furthermore after the device V has established that the interruption to the connection is at an end, the data transmission between the mobile station MS and the station ST is continued.

As an alternative to the diagram shown in FIG. 3, the exemplary embodiment in accordance with FIG. 3 can also be executed by, as already described in FIG. 2, the further device V' being arranged between the device V and the base station controller BSC and taking over those functionalities which were previously assumed on the basis of FIG. 3 by the base station controller BSC. In this case, the method can again be applied, without the base stations or base station controllers already used in an existing radio access network having to be changed themselves.

The exemplary embodiment for FIG. 3 also finds its preferred application in the case in which the further mobile station MS', the mobile station MS, the base station BTS and also the device V are all arranged in an aircraft, there is a satellite link between the device V and the base station controller BSC, and the base station controller BSC is located on the ground. The station ST can be arranged in a radio communication system in which the mobile stations MS, MS' are also located, as well as in another radio communication system. For example the station ST can also involve a telephone in a fixed network or a computer connected for example by a radio module to a radio communication system.

Naturally the signaling shown in FIGS. 1 to 3 can also be undertaken in the opposite direction by the first heartbeat S1 being sent from the base station controller BSC to the device V or the further device V' and the device V sending the second heartbeat S2 in the case of FIG. 1 and FIG. 3 to the base station BTS or receiving the third heartbeat S3 in the case of FIG. 2 from the base station BTS. This is therefore equivalent to the previously described exemplary embodiments, with the position of the base station BTS and the base station controller being swapped in the Figures.

The device V is for example integrated into the base station controller BSC or connected to the latter via an electrical or an optical line. The further device V' is for example integrated into the base station controller BSC or is connected to the latter via an electrical or an optical line.

The device V and the further device V' are for example implemented entirely or partly as a computer program product. Computer program product is taken to mean within the context of the above description, in addition to the actual computer program and (with its technical effect extending beyond the normal interaction between program and processing unit) in particular a recording medium for the computer program, a collection of files, a configured processing unit, e.g. a computer, but also for example a memory device or a server on which the files belonging to the computer program are stored.

With regard to the computer program product, the computer program can feature program sections for executing the method described above.

A connection set up to create a data transmission can also be referred to as a logical connection. The abortion of a logical connection can be avoided by the method even if a physical connection between two network elements is interrupted or disturbed over which data is transmitted within the framework of the logical connection.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a device in a radio access network of a radio communication system, the device being arranged between a first network element and a second network element of the radio access network, the method comprising:

receiving a first heartbeat at the device from the first network element at a first point in time;

sending a first acknowledgement signal as a response to the first heartbeat, the first acknowledgement signal being sent from the device to the first network element at a second point in time, the first acknowledgement signal signaling to the first network element that a connection exists between the first network element and the second network element;

sending a second heartbeat from the device to the second network element at a third point in time; and sending a second acknowledgement signal from the second network element to the device upon the second network element receiving the second heartbeat, the second acknowledgement signal signaling to the device that a connection exists between the device and the second network element wherein the first acknowledgement signal is at least partially sent even if no second acknowledgement signal was received between the first point in time and the second point in time.

2. The method as claimed in claim 1, wherein
the first and second heartbeats are received and sent repeatedly and have different repetition rates.
3. The method as claimed in claim 1, wherein
the repetition rate of the second heartbeat depends on the type of the connection between the device and the second network element.
4. The method as claimed in claim 1, wherein
data of a radio connection of a mobile station of the radio communication system is transmitted between the first network element and the second network element,
the device detects an interruption of the connection between the device and the second network element, and
during the interruption, the device takes over for the second network element in exchanging or processing of the data so as to maintain the radio connection to the first network element.
5. The method as claimed in claim 1, wherein
the device receives data via the first network element to set up a data transmission to a subscriber station of the radio communication system, the subscriber station being accessible via the second network element,
the device detects an interruption of its connection to the second network element, and
the device stores the data received and sets up the data transmission on the basis of the data stored as soon as a connection to the second network element exists.
6. The method as claimed in claim 4, wherein
the radio connection is to exchange data between a mobile station and a subscriber station,
the device, the mobile station, and/or the subscriber station sends information regarding interruption of the connection.
7. The method as claimed in claim 1, wherein
the first network element is arranged hierarchically above the second network element.
8. The method as claimed in claim 1, wherein
the first network element is a base station controller and the second network element is a base transceiver station.
9. The method as claimed in claim 1, wherein
the first network element is a base transceiver station and the second network element is a base station controller.
10. The method as claimed in claim 1, wherein
a further device is arranged between the device and the second network element,
the further device receives the second heartbeat, and
instead of the second network element, the further device sends the second acknowledgement signal to the device on receipt of the second heartbeat.
11. The method as claimed in claim 10, wherein
the further device receives a third heartbeat from the second network element,
the further device sends a third acknowledgement signal to the second network element as a response to the third heartbeat received from the second network element, the third acknowledgement signal indicating that a connection exists with the first network element, and
the third acknowledgement signal is sent without the further device having information regarding whether a connection exists with the first network element.
12. The method as claimed in claim 4, wherein
the second device passes the data to a subscriber station, the mobile station exchanging data with the subscriber station, and
the further device or the second network element sends information regarding the interruption of the connection.

13. The method as claimed in claim 1, wherein
signals are transmitted between the device and the second network element over an air interface.
14. The method as claimed in claim 2, wherein
the repetition rate of the second heartbeat depends on the type of the connection between the device and the second network element.
15. The method as claimed in claim 14, wherein
data of a radio connection of a mobile station of the radio communication system is transmitted between the first network element and the second network element,
the device detects an interruption of the connection between the device and the second network element, and
during the interruption, the device takes over for the second network element in exchanging or processing of the data so as to maintain the radio connection to the first network element.
16. The method as claimed in claim 15, wherein
the device receives data via the first network element to set up a data transmission to a subscriber station of the radio communication system, the subscriber station being accessible via the second network element,
the device detects an interruption of its connection to the second network element, and
the device stores the data received and sets up the data transmission on the basis of the data stored as soon as a connection to the second network element exists.
17. The method as claimed in claim 16, wherein
the radio connection is to exchange data between a mobile station and a subscriber station,
the device, the mobile station, and/or the subscriber station sends information regarding interruption of the connection.
18. The method as claimed in claim 17, wherein
the first network element is arranged hierarchically above the second network element.
19. A radio access network comprising:
a first network element;
a second network element; and
a device arranged between the first network element and the second network element, the device comprising:
a first receiving unit to receive a first heartbeat at the device from the first network element at a first point in time;
a first sending unit to send a first acknowledgement signal as a response to the first heartbeat, the first acknowledgement signal being sent from the device to the first network element at a second point in time, the first acknowledgement signal signaling to the first network element that a connection exists between the first network element and the second network element;
a second sending unit to send a second heartbeat to the second network element at a third point in time; and
a second receiving unit to receive a second acknowledgement signal from the second network element to the device upon the second network element receiving the second heartbeat, the second acknowledgement signal signaling to the device that a connection exists between the device and the second network element, wherein
the first acknowledgement signal is at least partially sent even if no second acknowledgement signal was received between the first point in time and the second point in time.
20. A device arranged between a first network element and a second network element, the device comprising:

a first receiving unit to receive a first heartbeat at the device from the first network element at a first point in time;

a first sending unit to send a first acknowledgement signal as a response to the first heartbeat, the first acknowledgement signal being sent from the device to the first network element at a second point in time, the first acknowledgement signal signaling to the first network element that a connection exists between the first network element and the second network element;

a second sending unit to send a second heartbeat to the second network element at a third point in time; and a second receiving unit to receive a second acknowledgement signal from the second network element to the device upon the second network element receiving the second heartbeat, the second acknowledgement signal signaling to the device that a connection exists between the device and the second network element, wherein the first acknowledgement signal is at least partially sent even if no second acknowledgement signal was received between the first point in time and the second point in time.

* * * * *

UNITED STATES PATENT AND TRADEMARK OFFICE
CERTIFICATE OF CORRECTION

| | | |
|---|---|---|
| PATENT NO. | : 7,817,594 B2 | Page 1 of 1 |
| APPLICATION NO. | : 11/600812 | |
| DATED | : October 19, 2010 | |
| INVENTOR(S) | : Jöerg Brenner et al. | |

It is certified that error appears in the above-identified patent and that said Letters Patent is hereby corrected as shown below:

Title Page, Item (75) (Inventors), Line 1, change "Jorg" to --Joerg--.

Signed and Sealed this
Eleventh Day of January, 2011

David J. Kappos
*Director of the United States Patent and Trademark Office*